United States Patent [19]
White et al.

[11] Patent Number: 5,983,273
[45] Date of Patent: Nov. 9, 1999

[54] METHOD AND APPARATUS FOR PROVIDING PHYSICAL SECURITY FOR A USER ACCOUNT AND PROVIDING ACCESS TO THE USER'S ENVIRONMENT AND PREFERENCES

[75] Inventors: Christopher M. White; John Matheny, both of San Francisco; Patrick P. Bonnaure, Redwood Shores; Stephen G. Perlman, Mountain View, all of Calif.

[73] Assignee: WebTV Networks, Inc., Mountain View, Calif.

[21] Appl. No.: 08/931,816

[22] Filed: Sep. 16, 1997

[51] Int. Cl.[6] .................................................. G06F 13/00
[52] U.S. Cl. ............................................ 709/229; 380/21
[58] Field of Search ......................... 395/200.33, 200.49, 395/200.58, 200.47, 200.59, 200.55, 200.57; 380/26, 49, 25, 4, 21, 23, 30; 709/200, 203, 217, 219, 220, 224, 225, 226, 227, 228, 229

[56] References Cited

U.S. PATENT DOCUMENTS

| | | | |
|---|---|---|---|
| 5,590,197 | 12/1996 | Chen et al. | 380/24 |
| 5,602,905 | 2/1997 | Mettke | 379/96 |
| 5,602,918 | 2/1997 | Chen et al. | 380/21 |
| 5,671,279 | 9/1997 | Elgamal | 380/23 |
| 5,710,887 | 1/1998 | Chelliah et al. | 709/217 |
| 5,719,938 | 2/1998 | Haas et al. | 380/21 |
| 5,727,156 | 3/1998 | Herr-Hoyman et al. | 709/219 |
| 5,729,594 | 3/1998 | Klingman | 705/26 |
| 5,737,419 | 4/1998 | Ganesan | 380/21 |
| 5,742,845 | 4/1998 | Wagner | 705/26 |
| 5,748,735 | 5/1998 | Ganesan | 380/21 |
| 5,754,939 | 5/1998 | Herz et al. | 709/219 |
| 5,778,173 | 7/1998 | Apte | 380/25 |
| 5,812,765 | 9/1998 | Curtis | 709/200 |
| 5,815,665 | 9/1998 | Teper et al. | 709/229 |
| 5,825,881 | 10/1998 | Colvin, Sr. | 380/24 |
| 5,845,267 | 12/1998 | Ronen | 709/246 |
| 5,903,721 | 5/1999 | Sixtus | 713/201 |
| 5,905,248 | 5/1999 | Russell et al. | 235/462.27 |

OTHER PUBLICATIONS

PC Magazine Apr. 8, 1997, pp. 10, 30.
"Consumer Systems", downloaded from Website http://www.verifone.com/,1997.
"UK–Smart Card Cyber Kiosks Planned", Newsbytes, PNE WO7020042, Jul. 2, 1997.
"Tuning in to the Web", Bannan, Karen, PC Magazine, V16, n4, P62(2), Feb. 18, 1997.
"Is the internet must–see TV", Jennifer Triverio, Home PC, 1996, n312, PG–54.
"Consumers see Net meeting TV at CES" Seybold Report on Internet Publishing, V1, n6, p. 27(1), Feb. 1997.

*Primary Examiner*—Moustafa M. Meky
*Attorney, Agent, or Firm*—Workman, Nydegger, Seeley

[57] ABSTRACT

A method and apparatus for providing physical security for a user account and supplying access to the environment and preferences associated with a particular user are provided. An internet terminal is coupled to a server system. The internet terminal detects the presence of a smart card. The smart card includes a memory such as a programmable ROM (PROM), any form of erasable PROM (EPROM) or Flash memory having stored therein identification information. The internet terminal reads the identification information from the smart card and transmits the identification information to a server. According to another aspect of the present invention an internet terminal can be configured by a server. The server receives identification information from an internet terminal. The identification information uniquely identifies a smart card. The server locates configuration information associated with a particular user of the server based upon the identification information. The configuration information may include customer preferences for customizing the operation of the internet terminal such as the type of on-screen keyboard presented by the internet terminal, the font used by the internet terminal for displaying text, background music options, and e-mail options. In any event, after locating the configuration information, the server downloads the configuration information to the internet terminal.

27 Claims, 8 Drawing Sheets

| 605 | 610 | 615 | 620 | 625 | 630 | 635 |
|---|---|---|---|---|---|---|
| SILICON ID | SUBSCRIBER INFORMATION | CUSTOMER ID | USERNAME | PASSWORD | SMARTCARD ID | SMARTCARD PASSWORD |
| ... | ... | ... | ... | ... | ... | ... |

| 615 | 645 | 650 | 655 |
|---|---|---|---|
| CUSTOMER ID | FAVORITE URL(S) | FAVORITE TITLE(S) | FAVORITE THUMBNAIL(S) |
| ... | ... | ... | ... |

METHOD AND APPARATUS FOR PROVIDING PHYSICAL SECURITY FOR A USER ACCOUNT AND PROVIDING ACCESS TO THE USER'S ENVIRONMENT AND PREFERENCES

FIELD OF THE INVENTION

The invention relates generally to the field of client-server computer networking. More particularly, the invention relates to a method and apparatus for providing physical security for a user account and supplying access to the environment and preferences associated with a particular user.

BACKGROUND OF THE INVENTION

The number of people using the Internet and the World Wide Web (the Web) has increased substantially in recent years. Some Internet users gain access to the services of the Internet and the Web through user accounts provided by their employer or an educational institution. Others access the Internet from their home computers through accounts supplied by commercial Internet access providers such as America Online™, CompuServe™ or the like. In any event, these accounts provide only a minimal amount of security against intrusion. Typical account security includes merely a username and a password, typically both chosen by the user.

One of the disadvantages of these typical Internet access accounts is the vulnerability to invasion as a result of the poor security. For example, passwords can be cracked by password crack programs employing password cracking dictionaries or by brute force password guessing programs. Further, users are sometimes tricked into disclosing their account passwords. For example, individuals purporting to be support staff for a particular online service were able to convince subscribers to reveal their passwords.

Internet access providers generally charge an hourly or monthly fee for a user account. Due, at least in part, to the cost of such an account, many people are still without access to the Internet and the Web. In fact, these costs may be incentive enough for some people to break into user accounts to gain access to the Internet services such as chat and electronic mail (e-mail). Others apparently find pleasure in gaining access to another's account.

Based on the foregoing, it is desirable to provide more security for user accounts. Specifically, it is desirable to provide a mobile mechanism of physical security. Also, it would be desirable for the host system to associate user preferences and environment with the physical security mechanism, thereby making the preferences and environment available to the user upon establishing a user session by way of the physical security device.

SUMMARY OF THE INVENTION

A method and apparatus for providing physical security for a user account and supplying access to the environment and preferences associated with a particular user are described. An internet terminal is coupled to a server system. The internet terminal determines whether or not a smart card is present. If so, the internet terminal reads identification information from a memory in the smart card and requests initiation of a user session by transmitting the identification information to a server. Otherwise, if a smart card is not present, the internet terminal requests initiation of a user session by transmitting an identifier that identifies the internet terminal. In this manner, a user that is not associated with an internet terminal may bypass the normal log-in processing of the internet terminal and request initiation of a user session with his/her smart card.

According to another aspect of the present invention an internet terminal can be configured by a server. The server receives identification information from an internet terminal. The identification information uniquely identifies a smart card from which it was read. The server locates configuration information associated with a particular user of the server based upon the identification information. After locating the configuration information, the server downloads the configuration information to the internet terminal. Advantageously, by employing the smart card, the particular user's preferences are made available to the user upon establishing a user session from another's internet terminal.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6A illustrates an exemplary customer database record according to one embodiment of the present invention.

FIG. 6B illustrates an exemplary favorites database record according to one embodiment of the present invention.

DETAILED DESCRIPTION

A method and apparatus are described for providing physical security for a user account and supplying access to the environment and preferences associated with a particular user. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps can be embodied in machine-executable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

System Overview

The present invention may be included in a system, known as WebTV™, for providing a user with access to the Internet. WebTV™ and WebTV Networks™ are trademarks of WebTV Networks, Inc. of Palo Alto, Calif. A user of a WebTV client generally accesses a WebTV server via a direct-dial telephone (POTS, for "plain old telephone service"), ISDN (Integrated Services Digital Network), or other similar connection, in order to browse the Web, send and receive e-mail, and use various other WebTV network services. The WebTV network services are provided by WebTV servers using software residing within the WebTV servers in conjunction with software residing within a WebTV client.

Figure 1:
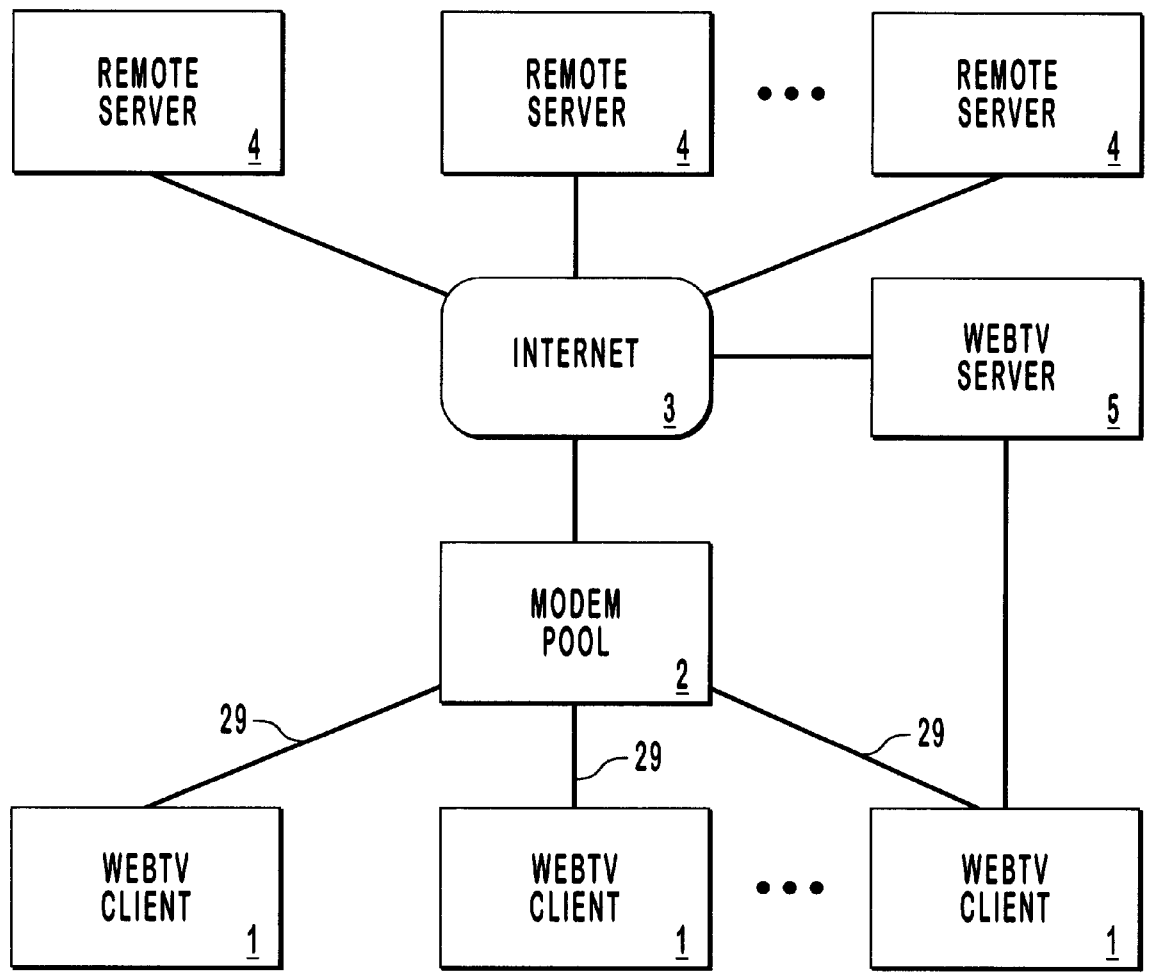
FIG. 1 illustrates several clients connected to a proxying server in a network.

FIG. 1 illustrates a basic configuration of the WebTV network according to one embodiment. A number of WebTV clients 1 are coupled to a modem pool 2 via direct-dial, bi-directional data connections 29, which may be telephone (POTS, i.e., "plain old telephone service"), ISDN (Integrated Services Digital Network), or any other similar type of connection. Other connection mechanisms may be employed such as cable and satellite forward channels, for example. In any event, the modem pool 2 is coupled typically through a router, such as that conventionally known in the art, to a number of remote servers 4 via a conventional network infrastructure 3, such as the Internet. The WebTV system also includes a WebTV server 5, which specifically supports the WebTV clients 1. The WebTV clients 1 each have a connection to the WebTV server 5 either directly or through the modem pool 2 and the Internet 3. Note that the modem pool 2 is a conventional modem pool, such as those found today throughout the world providing access to the Internet and private networks.

Note that in this description, in order to facilitate explanation the WebTV server 5 is generally discussed as if it were a single device, and functions provided by the WebTV services are generally discussed as being performed by such single device. However, the WebTV server 5 may actually comprise multiple physical and logical devices connected in a distributed architecture, and the various functions discussed below which are provided by the WebTV services may actually be distributed among multiple WebTV server devices.

An Exemplary Client System

Figure 2:
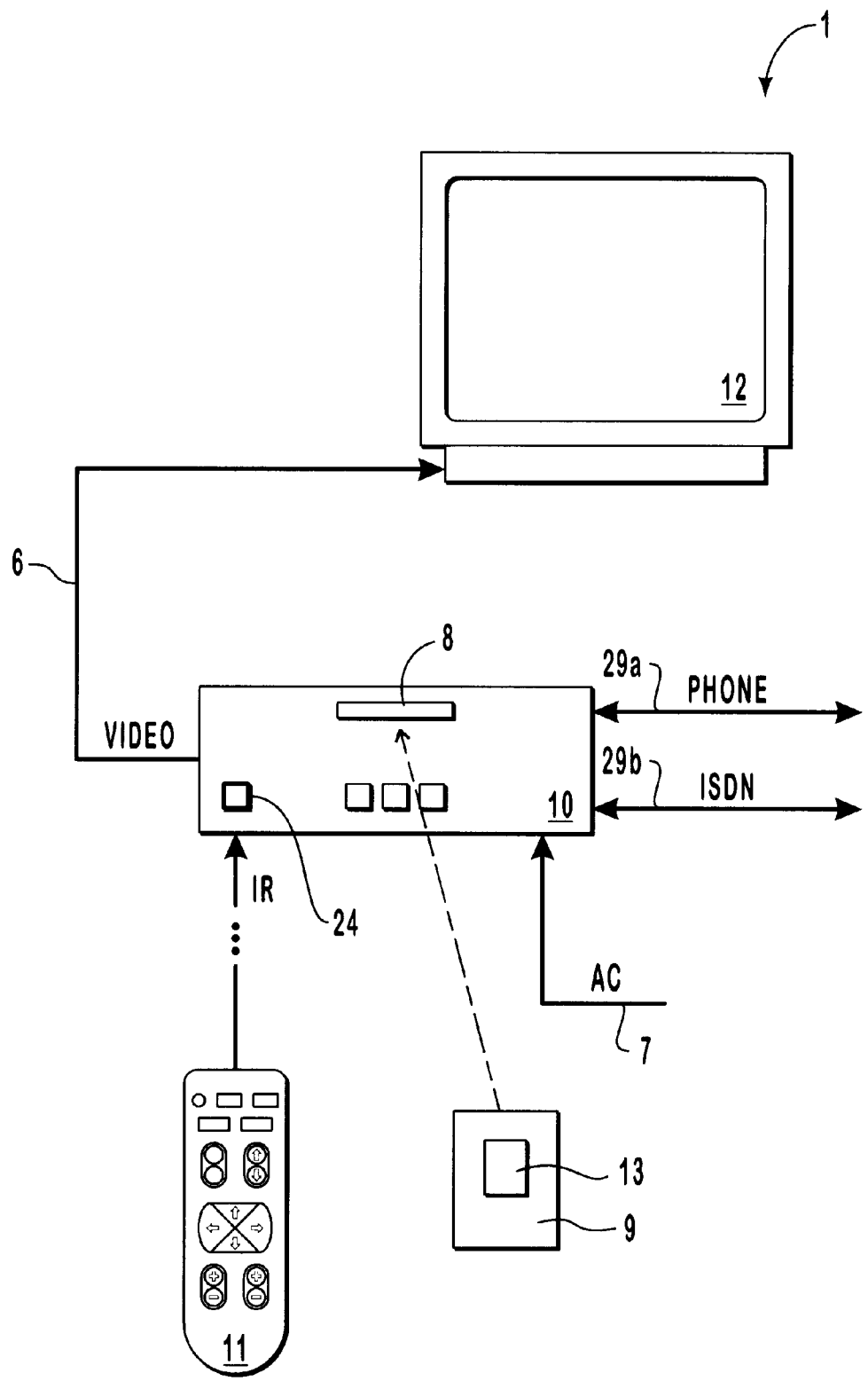
FIG. 2 illustrates a client according to one embodiment of the present invention.

FIG. 2 illustrates a WebTV client 1 according to one embodiment of the present invention. In this embodiment, the WebTV client 1 includes an Internet terminal 10 (hereinafter referred to as "the WebTV box 10"), an ordinary television set 12, and a remote control 11. In an alternative embodiment of the present invention, the WebTV box 10 is built into the television set 12 as an integral unit. The WebTV box 10 includes hardware and software for providing the user with a graphical user interface, by which the user can access the WebTV network services, browse the Web, send e-mail, and otherwise access the Internet.

The WebTV client 1 uses the television set 12 as a display device. The WebTV box 10 is coupled to the television set 12 by a video link 6. The video link 6 is an RF (radio frequency), S-video, composite video, or other equivalent form of video link. In the preferred embodiment, the client 1 includes both a standard modem and an ISDN modem, such that the communication link 29 between the WebTV box 10 and the server 5 can be either a telephone (POTS) connection 29a or an ISDN connection 29b. The WebTV box 10 receives power through a power line 7.

The WebTV box 10 also includes a SmartCard slot 8 for receiving an optional SmartCard 9. The SmartCard 9 may be a plastic card that includes a memory chip 13, for example. In one embodiment, the memory chip 13 is pre-programmed with identification information for uniquely identifying the SmartCard 9. Preferably, the memory chip 13 is embedded within the SmartCard 9. Various semiconductor memories may be used for memory chip 13 such as a programmable ROM (PROM), any form of erasable PROM (EPROM) or Flash memory. It will be recognized that numerous other storage devices are suitable for use as the memory chip 13. Since portability is important, preferably, the SmartCard 9 is the size of a typical credit card. In alternative embodiments, the SmartCard 9 may additionally include one or more microprocessors and/or additional memory chips such as a random access memory (RAM), for example. Further, to facilitate reusability of SmartCards, the unique identification information may be generated by a centralized authority and previously stored SmartCard identification information may be overwritten.

In the embodiment depicted, the user may operate remote control 11 to control the WebTV client 1 in browsing the Web, sending e-mail, and performing other Internet-related functions. The WebTV box 10 receives commands from remote control 11 via an infrared (IR) communication link. In alternative embodiments, the link between the remote control 11 and the WebTV box 10 may be RF or any equivalent mode of transmission.

Figure 3:
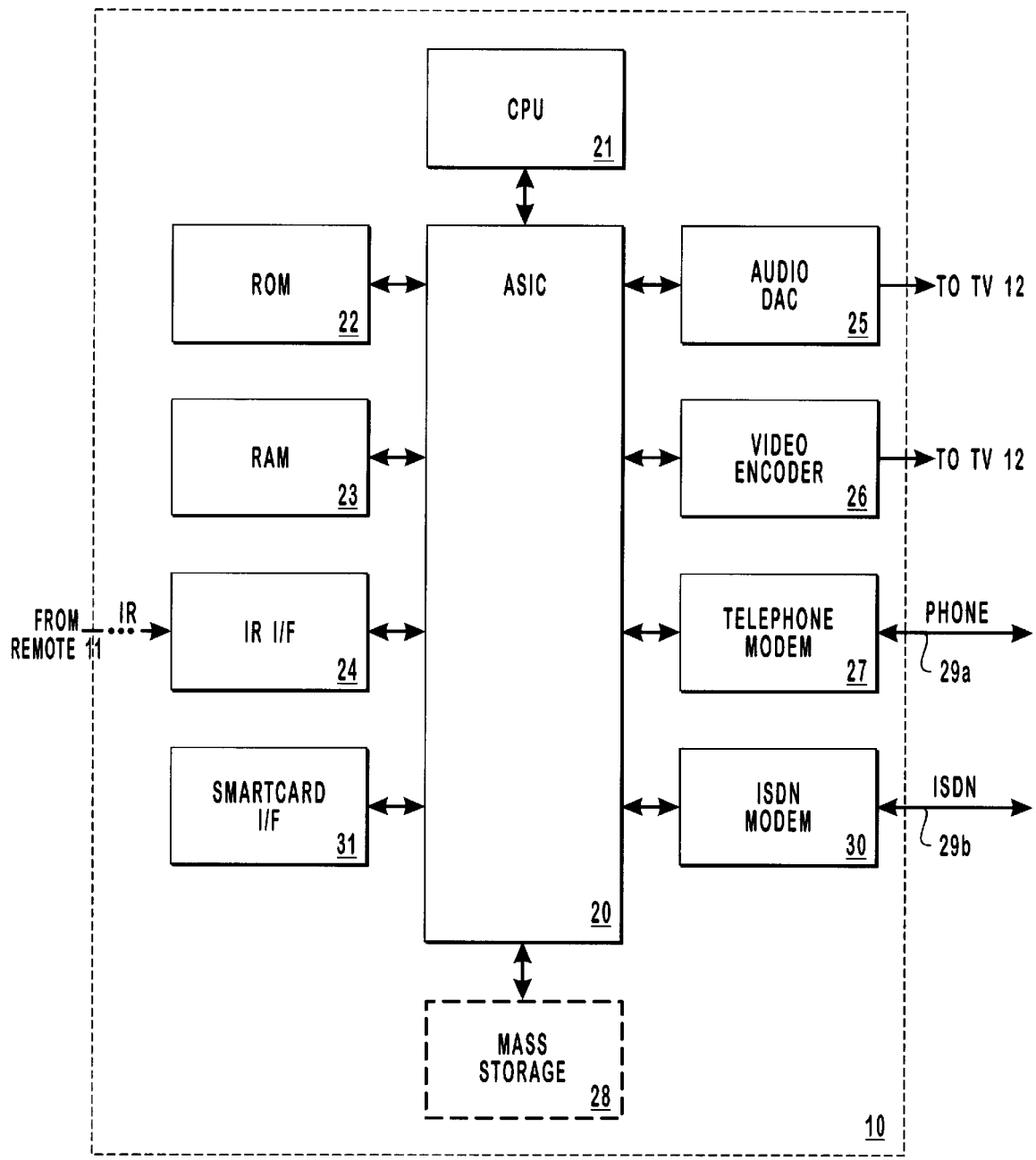
FIG. 3 is a block diagram of an Internet terminal according to one embodiment of the present invention used to implement a Web browser that can be operated by remote control.

FIG. 3 is a block diagram of the internal features of the WebTV box 10 according to one embodiment of the present invention. In this embodiment, operation of the WebTV client 1 is controlled by a central processing unit (CPU) 21 which is coupled to an Application-Specific Integrated Circuit (ASIC) 20. The CPU 21 executes software designed to implement features of the present invention. ASIC 20 contains circuitry which may be used to implement certain features provided by the WebTV client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. ASIC 20 is further coupled to a SmartCard interface 31. The SmartCard interface detects the presence of a SmartCard such as SmartCard 9 and signals the ASIC 20 accordingly. A standard telephone modem 27 and an ISDN modem 30 are coupled to ASIC 20 to provide connections 29a and 29b, respectively, to the modem pool 2 and, via the Internet 3, to the remote servers 4. Note that the WebTV box 10 also may include a cable television modem (not shown).

Also coupled to ASIC 20 is Read-Only Memory (ROM) 22, which provides storage of program code for implementing the application software to be executed by the WebTV box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

An Exemplary Server System

Figure 4:
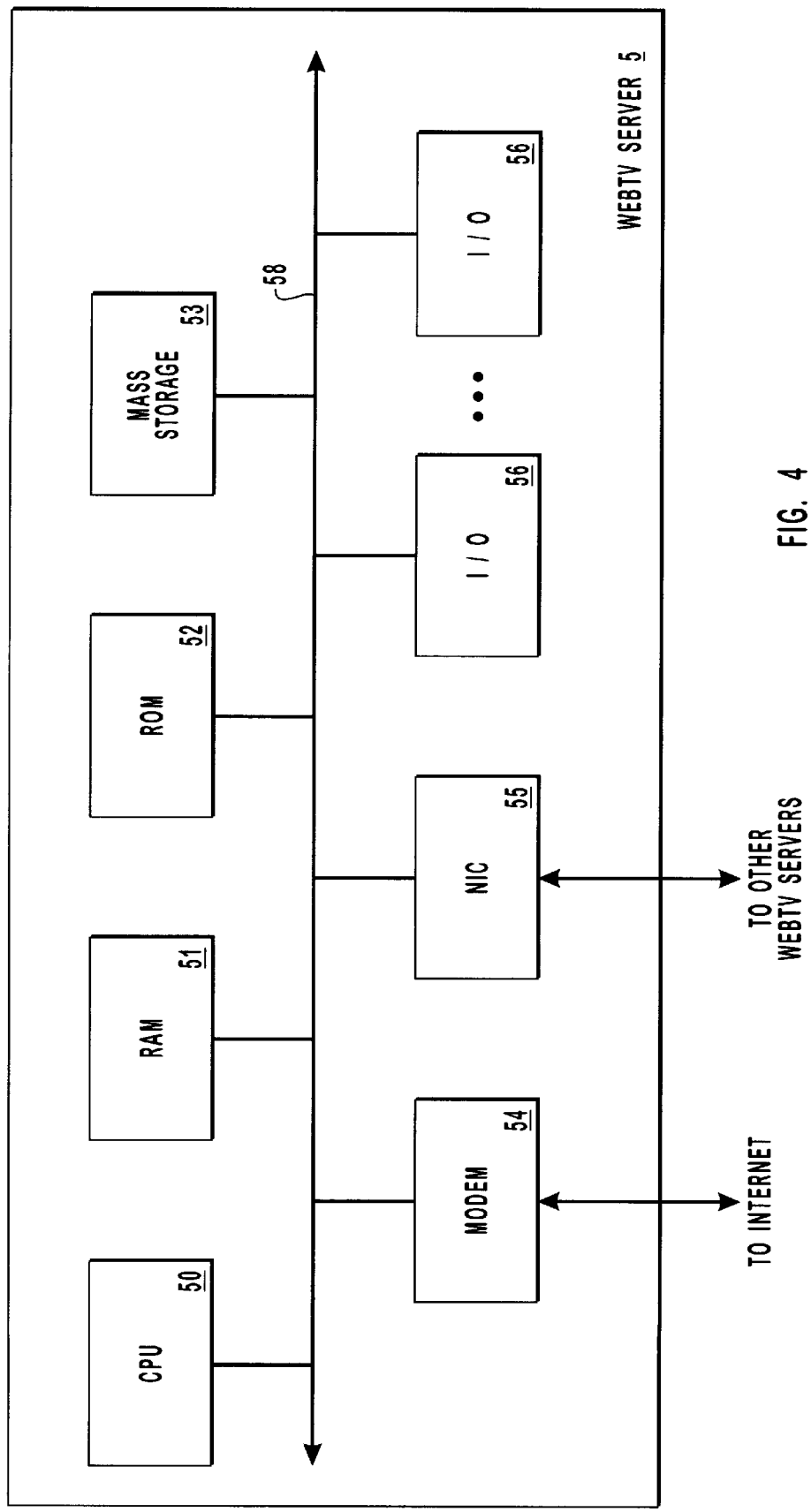
FIG. 4 is a block diagram of a server according to one embodiment of the present invention.

The WebTV server 5 generally includes one or more computer systems generally having the architecture illustrated in FIG. 4. It should be noted that the illustrated architecture is only exemplary; the present invention is not constrained to this particular architecture. The illustrated architecture includes a central processing unit (CPU) 50, random access memory (RAM) 51, read-only memory (ROM) 52, a mass storage device 53, a modem 54, a network interface card (NIC) 55, and various other input/output (I/O) devices 56. Mass storage device 53 includes a magnetic, optical, or other equivalent storage medium. I/O devices 56 may include any or all of devices such as a display monitor, keyboard, cursor control device, etc. Modem 54 is used to communicate data to and from remote servers 4 via the Internet.

As noted above, the WebTV server 5 may actually comprise multiple physical and logical devices connected in a distributed architecture. Accordingly, NIC 55 is used to provide data communication with other devices that are part of the WebTV services. Modem 54 may also be used to communicate with other devices that are part of the WebTV services and which are not located in close geographic proximity to the illustrated device.

Exemplery Services, Databases, Customer Preferences, and Environment

Figure 5:
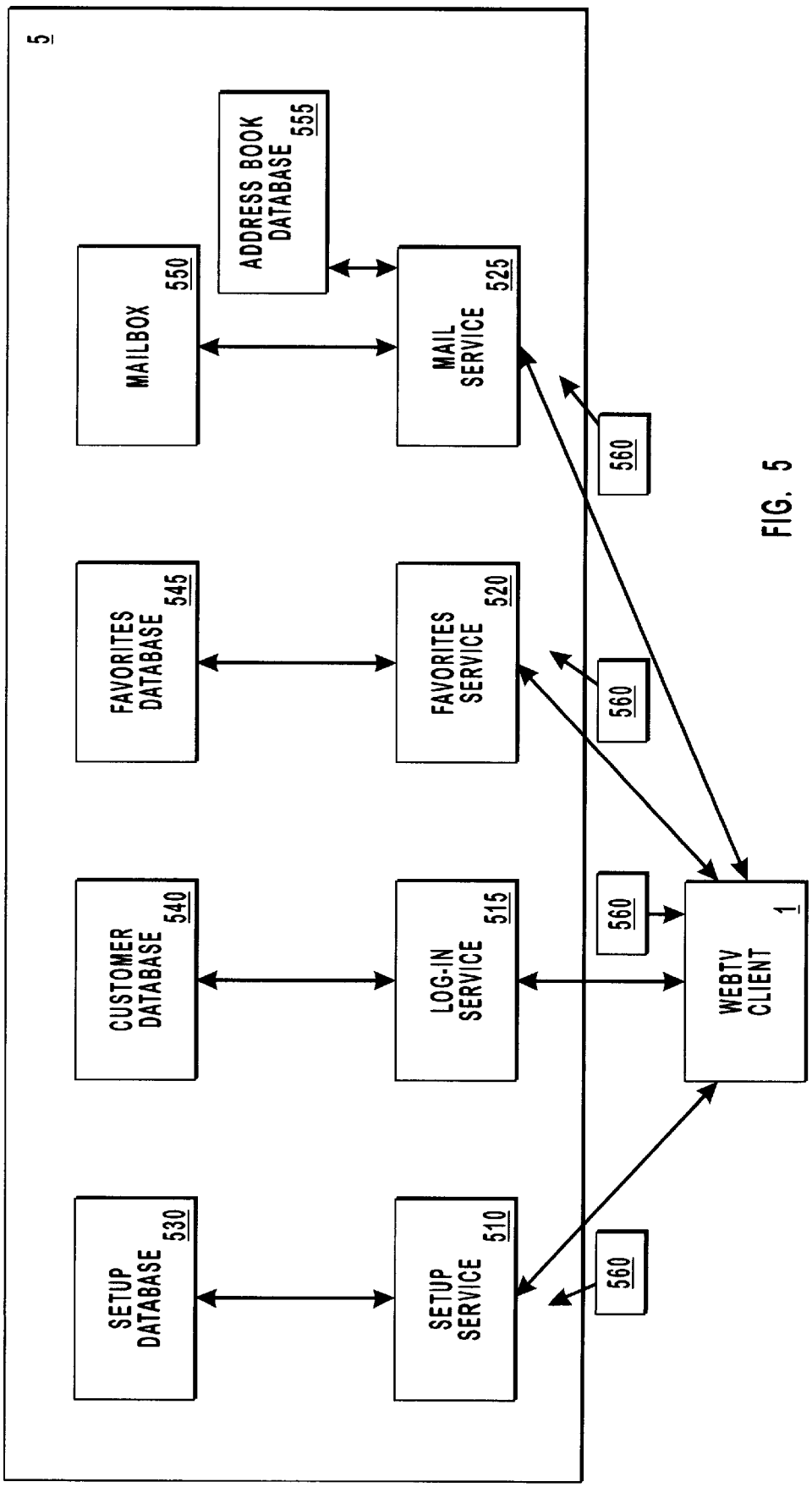
FIG. 5 is a block diagram of a server system showing relationships between various services and corresponding databases according to one embodiment of the present invention.

As shown in FIG. 5, a WebTV server 5 may provide a number of services such as a setup service 510, a log-in service 515, a favorites service 520, and a mail service 525. Each service may be associated with one or more persistent databases where customer information may be stored such as customer preferences related to the particular service. Note the specific choice of services and databases for this example is illustrative only. In this example, a setup database 530 is associated with the setup service 510, a customer database 540 is associated with the log-in service 515, a favorites database 545 is associated with the favorites service 520, and a mailbox 550 and an address book database 555 are associated with the mail service 525. In alternative embodiments, more or less services and databases may be provided. Also, while these services are shown as being provided by a single WebTV server 5, it should be appreciated that the services and databases may be distributed among one or more servers.

In this embodiment, the log-in service 515 is used specifically to control initial log-on procedures by a client 1. The log-in service 515 has exclusive access to the customer database 540. As will be discussed further with respect to FIG. 6A, the customer database 540 may store various information pertaining to each authorized user of a client 1 such as a unique customer id, and other information used to control certain features relating to access privileges and capabilities of the user. This information may be used to regulate initial access to the WebTV service during the establishment of a user session, as well as to facilitate access to the individual services provided by the WebTV service.

The setup service 510 provides the user with the ability to customize the operation of the WebTV box 10. An exemplary set of customer preferences may include the following: the type of on-screen keyboard presented by the WebTV box 10; the font used for displaying text on the display device 12; background music options, and e-mail options. With respect to the on-screen keyboard, the user may indicate his/her preference between a traditional keyboard (e.g., QWERTY) or an alphabetical keyboard (e.g. a, b, c, d, etc.), for example. Regarding the font used for displaying text, the user may indicate preferences relating the font size such as small, medium, or large font size. With respect to background music options, the user may choose whether background music is enabled or disabled and if enabled, the preferred type of background music may be selected. E-mail preferences may include the listing order of e-mail messages (e.g., newest to oldest, oldest to newest, etc.), a text signature to be appended to outgoing e-mail messages, and addressing options (e.g., whether a carbon copy line should be included on outgoing e-mail messages). These customer preferences may be maintained by the setup service 510 and made available to the WebTV box 10 when a user session is established. For example, to help the user feel at home while connected to the WebTV service through another's WebTV box 10, the customer preferences associated with the particular user may be downloaded to the WebTV box 10 from the setup service 510 when a user session is established. The customer preferences for each user may be conveniently stored in a database such as the setup database 530. The preferences may be accessed from the database using a unique customer id associated with the user, for example. Such a unique id may be stored in the customer database 540 as discussed further with respect to FIG. 6A.

Having described customer preferences related to the operation of the WebTV box 10, exemplary elements of a user's environment will now be described. The environment may include preferences and other data related to a particular user's account. In this embodiment, information regarding a particular user's environment is also maintained in one or more persistent databases on one or more WebTV servers 5. An exemplary user environment may include information pertaining to favorite Web pages and/or e-mail such as stored or newly received e-mail messages and an e-mail identifier.

In the embodiment depicted, the favorites service 520 tracks a user's favorite or preferred Web pages. Each user may have an individual favorites list. Essentially, the favorites service 520 acts as a bookmark facility allowing the user to mark certain favorite Web pages. Further, the favorites service 520 provides a way to jump to those favorite Web pages. When a user indicates a Web page being displayed is a "favorite," it is added to the user's list of favorites and stored in a database such as the favorites database 545. Additionally, the favorite Web pages may be organized into user-defined categories. For example, a user might have a set of favorite pages including Web pages providing real-time stock quotes, portfolio valuations, and financial news grouped in a category labeled "financial information." Like the setup database 530, the favorites database 545 may be organized by customer id. An exemplary favorites database record will be discussed below.

The mail service 525 provides functions to support sending and retrieving e-mail. The mailbox 550 may store a list of new e-mail and a list of stored e-mail for each user. The mailbox 550 may be organized by the user's e-mail identifier or by customer id. Each user may maintain e-mail address lists in an address book database 555. As above, the e-mail address lists stored in the address book database 555 may be accessed by the user's customer id. Each e-mail address list record may contain an e-mail address for an individual and a name to be associated with the address, for example.

A Typical Log-in Scenario

A typical log-in scenario involves a client 1 requesting access to the WebTV service by transmitting an embedded silicon id that uniquely identifies the WebTV box 10 to the log-in service 515. Therefore, the WebTV box 10 itself serves as one level of physical security. A user's account cannot be accessed without at least his/her WebTV box 10 or SmartCard 9. A SmartCard 9 log-in scenario is discussed below.

In any event, upon receiving the silicon id, the log-in service 515 consults the customer database 540 to determine if access to the server 5 by this particular WebTV box 10 is authorized. Assuming access is authorized, the log-in service 515 determines the user(s) associated with the WebTV box 10 and transmits a log-in screen which is presented to the user by the WebTV box 10 via the display device 12. The log-in screen displays the usernames of the authorized users of the WebTV box 10. When the user selects one of the displayed usernames and enters an optional password associated with his/her account, a log-on request is transmitted to the log-in service 515. In response to the log-on request by the WebTV box 10, the log-in service 515 consults the customer database 540 to verify the user password.

Ticket Generation

Assuming the correct password has been entered by the user, the log-in service 515 proceeds to retrieve information pertaining to the particular user from the customer database 540. The log-in service 515 then generates a "ticket" 560, which is an information packet including the retrieved information. The ticket 560 is then provided to the WebTV box 10 that requested access. The ticket 560 includes information identifying the access privileges of a particular user with respect to services provided by the server 5. For example, the ticket 560 may include the username of the user operating the client 1, the real name of the user, the customer id associated with the user, and any filtering requested by the user with respect to viewing Web sites. As will be discussed further below, when the user makes a service request (e.g., a request to access to one of the services), the client 1 may submit a copy of the ticket 560 to that service.

An Exemplary Customer Database Record

FIG. 6A illustrates an exemplary customer database record according to one embodiment of the present invention. In this example, each record in the customer database 540 includes a silicon ID 605, a collection of subscriber information 610, a customer ID 615, a username 620, a password 625, a SmartCard ID 630, and a SmartCard password 635. As discussed above, the silicon ID 605 is an identifier such as a serial number that uniquely identifies a particular WebTV box 10. Because multiple users may share a WebTV box 10, in this embodiment, there is a one-to-many relationship between the silicon ID 605 and the fields associated with a particular user. The subscriber information 610 may include such information as administrative and billing data for a particular user including the user's real name, a credit card number, the user's address and phone number, etc. The customer ID 615 is an identifier such as a serial number that uniquely identifies a particular user of the WebTV service. The username 626 is a name the user has chosen to associate with his/her account. The username 626 may serve as the user's e-mail identifier within a particular domain. For example, a user having the username "merlin" might have an e-mail address of merlin@ webtv.net. The password 625 is optional, if a user chooses to assign a password to his/her account, then the WebTV service will require its entry upon log-in and perform appropriate validation before generating the ticket 560. The SmartCard ID 630 is also optional. Preferably, a separate SmartCard password 635 is associated with the SmartCard ID 630. However, the password 625 may be used for both the user password and the SmartCard password 635.

In any event, if a user has associated a SmartCard 9 with his/her account, then identification information stored on the SmartCard 9 such as an identification number for uniquely identifying the SmartCard 9 may be stored in a field in the customer record associated with that user such as the Smart-Card ID 630. In this manner, a translation may be performed from a particular SmartCard ID 630 to a customer ID 615, thereby allowing the WebTV service to identify a particular user at log-in and produce a ticket 560 without reference to the silicon ID 605 of the user's WebTV box 10. Therefore, as will be discussed further below, one advantage of associating a SmartCard 9 with a given user customer record in the customer database 540, is that the user can log-in to the WebTV service from any available client 1 such as one that might be provided by a hotel in each of its rooms for the benefit of its patrons. Thus, the user is not limited to logging in to the WebTV service from his/her WebTV box 10. Additionally, as will be explained further below, the user will automatically have access to his/her preferences such as those stored in the setup database 530 and his/her environment such as favorites and e-mail upon establishing a user session with a SmartCard 9.

An Exemplary Favorites Database Record

FIG. 6B illustrates an exemplary favorites database record according to one embodiment of the present invention. In this example, each record in the favorites database 545 includes the customer ID 615, a list of favorite uniform resource locators (URLs) 645, a list of favorite titles 650 each title corresponding to a URL in a list of favorite URLs 645, and a list of favorite thumbnails 655 each thumbnail corresponding to a particular URL in the list of favorite URLs 645. The list of favorite URLs 645 is a list including one or more URLs the user has designated as a "favorite." When the user designates a Web page as a favorite site, the URL of the Web page is stored in the list of favorite URLs 645 associated with the customer id 615 of the user. In this embodiment, a title of the Web page is also stored in the list of favorite titles 650. Further, a thumbnail image of the Web page may be stored in the list of favorite thumbnails 655. In this manner, when the user requests his/her favorite URLs, they may be graphically depicted with thumbnail images and titles. To jump to a favorite Web page, the user may select a thumbnail image corresponding to the Web page he/she desires. The server 5 may then request the URL associated with the thumbnail image selected.

Smartcard Log-in

In the log-in scenario discussed above, a silicon id associated with the user's WebTV box 10 was used to access the customer database 540 to generate the ticket 560. However, insertion of the SmartCard 9 inhibits the normal log-in processing sequence that involves the WebTV box 10 transmitting its silicon id to the log-in service 515, thereby allowing a user session to be initiated by someone other than the users associated with the particular the WebTV box 10. Rather, when a user logs into the WebTV service using a SmartCard 9, identification information stored on the Smart-Card 9 is used to initially access the customer database 540 rather than the silicon id of the particular WebTV box 10 employed. The log-in service 515 may search the customer database for a SmartCard ID 630 matching the identification information provided during log-in. Upon finding the appropriate customer record, the log-in service 515 can retrieve the customer ID 615 corresponding to the identification information. Once the log-in service 515 has determined the customer ID 615 associated with the SmartCard 9, ticket generation may proceed as discussed above.

Figure 7:
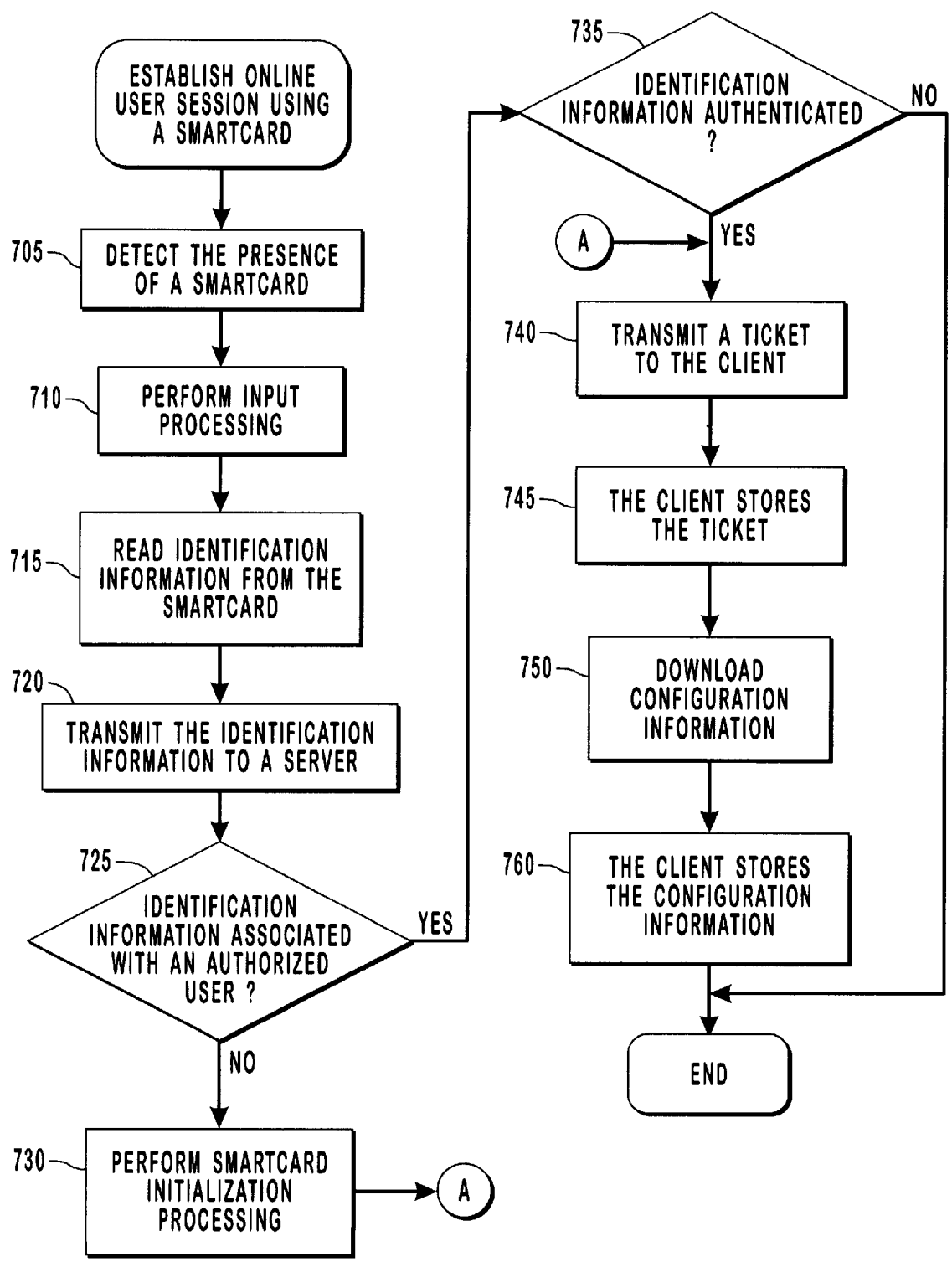
FIG. 7 is a flow diagram illustrating the establishment of an online user session according to one embodiment of the present invention.

FIG. 7 is a flow diagram illustrating the establishment of an online user session according to one embodiment of the present invention. At step 705, the WebTV box 10 detects the presence of a SmartCard 9 that has been inserted into the SmartCard slot 8. For example, SmartCard interface 31 may detect the presence of the SmartCard 9 and generate an input event.

At step 710, input processing is performed. In this embodiment, the WebTV box 10 may be in one of two high level states: powered down or powered up. When the WebTV box 10 is powered up, it may be sleeping or awake. In the powered up state, the WebTV box 10 may additionally be either disconnected or connected. In the powered down state, power may be limited to the particular circuitry of the WebTV box 10 necessary to detect input events such as those indicating the power button has been depressed or indicating the insertion of a SmartCard 9. In the sleeping state, a screen-saver may be active to prevent damage to the display device 12. In the disconnected state, the WebTV box is not in communication with the WebTV Service. In the connected state, the WebTV box 10 is in communication with the WebTV Service and may additionally have a ticket 560 stored in RAM 23. The input processing may include transitioning from the current state to a new state. For example, if the WebTV box 10 is in the powered down state when the SmartCard 9 is detected the WebTV box 10 may transition to the powered up state. Moreover, when the SmartCard 9 is detected, the sleeping state may give way to the awake state (e.g., the screen-saver may be deactivated).

At step 715, the identification information is read from the SmartCard 9. Subsequently, at step 720, the identification information is transmitted to a server 5 such as a server providing the log-in service 515.

At step 725, the log-in service 515, with reference to the customer database 540, determines if the identification information is associated with an authorized user of the WebTV Service. If the identification information is not found, processing continues with step 730. Otherwise, if the identification information is found, processing continues with step 735.

At step 730, the SmartCard 9 identification information is not currently associated with a customer record in the customer database 540. At this point, the user may choose to have the log-in service 515 perform SmartCard 9 initialization processing. The initialization processing may include storing the SmartCard 9 identification information in the SmartCard ID 630 of the customer record corresponding to the user. In this manner, during subsequent SmartCard 9 log-in attempts, the identification information will be found in step 725.

At step 735, the identification information has been found in a customer record. The log-in service 515 may require entry of a password before a ticket 560 is generated, if a password is associated with the SmartCard 9. If the identification information is not authenticated by the correct password, log-in will be denied and no user session will be established. However, if the correct password is entered, a ticket 560 will be generated as described above and transmitted to the client 1 at step 740.

At step 745, the client 1 receives the ticket 560 and stores it for future service access requests. The ticket 560 may be stored in a memory of the WebTV box 10 such as RAM 23.

At step 750, configuration information is downloaded to the client 1. Configuration information may include customer preferences associated with the particular user. The configuration information may be useful for tailoring certain operations of the internet terminal to the liking of a particular user. As discussed above, the setup service 510 may retrieve the customer preferences from a database such as the setup database 530 using the customer id in the ticket 560. At step 760, the client may store the client configuration information in a memory of the WebTV box 10 such as RAM 23.

Advantageously, the association of a SmartCard 9 with a user account provides a mobile mechanism for accessing the account while maintaining physical security. Additionally, the SmartCard 9 makes the user's preferences and environment accessible even when the user logs in to the WebTV service from a WebTV box 10 other than his/her own. For example, after the configuration information is downloaded in step 750, the particular WebTV box 10 employed will act in accordance with the user's previously established customer preferences.

Service Request Processing

Figure 8:
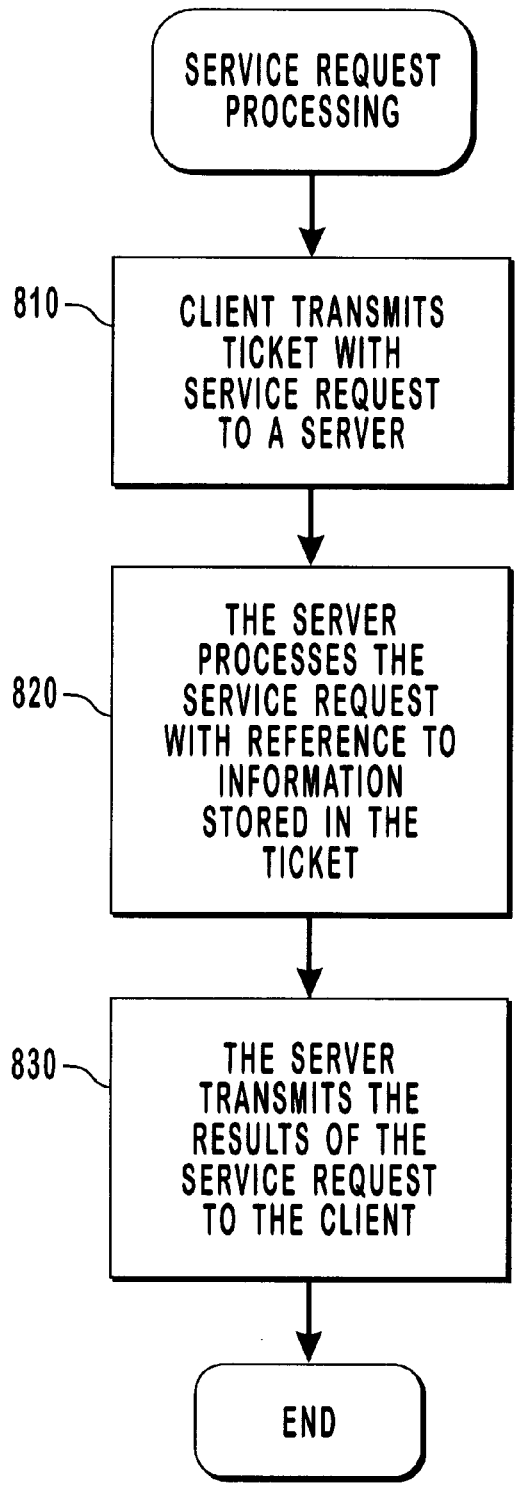
FIG. 8 is a flow diagram illustrating service request processing according to one embodiment of the present invention.

FIG. 8 is a flow diagram illustrating service request processing according to one embodiment of the present invention. In this embodiment, when the user makes a service request, the client 1 submits a copy of the ticket 560 to that service. The requested service may then determine from the copy of the ticket 560 whether access to that service by the user is authorized and, if so, any important information relating to such access. Further, information in the copy of the ticket 560 may be useful for facilitating the processing of the user's particular service request.

At step 810, a service request and a copy of the ticket 560 are transmitted to a server 5 such as one providing the mail service 525. The ticket 560 may have been generated in response to either the typical log-in scenario (i.e., the user logging in from his/her WebTV box 10) or the SmartCard log-in scenario (e.g., the user logging in from the WebTV box 10 of another).

At step 820, the server 5 processes the service request with reference to the information stored in the ticket 560. For example, if the service request is to view new e-mail messages, the mail service 525 may use the e-mail identifier in the ticket 560 to retrieve the user's e-mail from the mailbox 550.

At step 830, the server 5 transmits the results of the service request to the client 1. For example, the server S may compose a page of Hypertext Markup Language (HTML) including a list of newly received e-mail messages, in response to a user request to read his/her mail.

Thus, it should be appreciated, the WebTV service will respond to service requests in the manner defined by the user's environment whether the user has logged-in to the WebTV service from his/her WebTV box 10 or from another WebTV box 10 employing a SmartCard 9.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of initiating a user session with a server system from an internet terminal coupled to the server system, the method comprising the steps of:

an internet terminal determining whether or not a smart card is present;

if the smart card is present, then the internet terminal requesting initiation of a user session by reading identification information from a memory of the smart card, and transmitting the identification information to a server;

the server thereafter using the identification information to access a customer database maintained at the server in order to find a customer record which includes at least a smart card identifier, a customer identifier and a first password which matches a second password received from the client, thereby determining that the identification information read from the smart card is associated with an authorized user of the server;

if the smart card is not present, then the internet terminal requesting initiation of a user session by transmitting an identifier that identifies the internet terminal;

the server generating a ticket for use in accessing various services, the ticket including information from the customer record, which is then transmitted back to and stored by the internet terminal; and the server then processing a service request from the internet terminal according to a user environment associated with the authorized user.

2. The method of claim 1, further including the steps of:

the internet terminal transmitting the ticket with a service request; and the server processing the service request with reference to the information stored within the ticket.

3. The method of claim 2, wherein the service request is for a list of favorite web sites, wherein the information stored within the ticket includes a customer identifier, the step of processing the service request with reference to the information stored within the ticket further includes the step of retrieving the list of favorite web sites based upon the customer identifier.

4. The method of claim 2, wherein the service request is for a list of electronic mail, wherein the information stored within the ticket includes an electronic mail identifier, the step of processing the service request with reference to the information stored within the ticket further includes the step of electronic mail based upon the electronic mail identifier.

5. The method of claim 1, further including the steps of:

the server locating configuration information associated with the authorized user of the server based upon the identification information; and the server downloading the configuration information to the internet terminal.

6. The method of claim 5, wherein the configuration information includes information identifying one or more background music preferences.

7. The method of claim 5, wherein the configuration information includes information identifying one or more font preferences.

8. The method of claim 5, wherein the configuration information includes information identifying one or more on-screen keyboard preferences.

9. The method of claim 5, wherein the configuration information includes information identifying one or more electronic mail preferences.

10. The method of claim 1, wherein the internet terminal has a current state, and the method further includes the step of the internet terminal performing input processing based upon the current state.

11. The method of claim 10, wherein the step of performing input processing based upon the current state further includes the step of the internet terminal opening a connection with the server if the current state of the internet terminal is disconnected.

12. The method of claim 10, wherein the step of performing input processing based upon the current state further includes the step of the internet terminal powering itself up if the current state of the internet terminal is powered down.

13. The method of claim 10, wherein the step of performing input processing based upon the current state further includes the step of the internet terminal waking up by suspending the screen-saver if the current state of the internet terminal is sleeping.

14. In a computer network system that includes a plurality of server computer systems logically connected in order to provide access to one or more internet sites, and a plurality of client systems that serve as internet terminals connectable to one or more of the server computer systems, and wherein at least some of the client systems are comprised of a conventional television set and a processor connected to the television set so that internet sites may be viewed using the television set as a computer display monitor in conjunction with the processor, a method of permitting a particular user to log onto the computer network from any of the internet terminals independent of any internet terminal's unique id and independent of any unique user id and passwords associated with any terminal, the method comprising the steps of:

maintaining at one or more server computer systems unique id information for a plurality of the internet terminals, as well user id information for the users of each internet terminal, and any user passwords established for the users of each such internet terminal;

also maintaining at the one or more server computer systems unique id information for a plurality smart cards, each of which uniquely identifies a user of the computer network;

detecting at an internet terminal the presence of a smart card input to the internet terminal by a particular user, and thereafter transmitting to said one or more server computer systems the unique id information from the input smart card that identifies the particular user for that smart card in order to initiate a user session for the particular user; and at the server computer system to which the unique id information from the input smart card was transmitted, thereafter bypassing normal log in procedure which requires using the unique id information of the internet terminal being used by the particular user, and any user id and user passwords otherwise required for log in at that internet terminal and establishing the user session independent of such otherwise normal log in procedure.

15. The method of claim 14 further comprising the steps of:

at the server computer system to which the unique id information from the input smart card was transmitted, using the unique id information from the input smart card to locate configuration information associated with the particular user of that smart card; and downloading from the server computer system to the internet terminal at which the smart card was input the configuration information for the particular user of the input smart card.

16. The method of claim 15, wherein prior to the step of a server receiving identification information from an internet terminal the method further including the steps of:

the internet terminal reading identification information from a semiconductor memory of the smart card; and the internet terminal transmitting the identification information to the server.

17. The method of claim 15, wherein the configuration information is for tailoring one or more operations of the internet terminal to the particular user.

18. The method of claim 15, wherein the configuration information includes information identifying one or more background music preferences.

19. The method of claim 15, wherein the configuration information includes information identifying one or more font preferences.

20. The method of claim 15, wherein the configuration information includes information identifying one or more on-screen keyboard preferences.

21. The method of claim 15, wherein the configuration information includes information identifying one or more electronic mail preferences.

22. In a computer network system that includes a plurality of server computer systems logically connected in order to provide access to one or more internet sites, and a plurality or client systems that serve as internet terminals connectable to one or more of the server computer systems, and wherein at least some of the client systems are comprised of a conventional television set and a processor connected to the television set so that internet sites may be viewed using the television set as a computer display monitor in conjunction with the processor, a method of permitting a particular user to log onto the computer network from any of the internet terminals independent of any internet terminal's unique id and independent of any unique user id and passwords associated with any terminal, the method comprising the steps of:

maintaining at one or more server computer systems unique id information for a plurality of the internet terminals, as well user id information for the users of each internet terminal, and any user passwords established for the users of each such internet terminal;

also maintaining at the one or more server computer systems unique id information for a plurality smart cards, each of which uniquely identifies a user of the computer network and account information for the uniquely identified user;

detecting at an internet terminal the presence of a smart card input to the internet terminal by a particular user, and thereafter transmitting to said one or more server computer systems the unique id information from the input smart card that identifies the particular user for that smart card in order to initiate a user session for the particular user;

at the server computer system to which the unique id information from the input smart card was transmitted, thereafter bypassing normal log in procedure which requires using the unique id information of the internet terminal being used by the particular user, and any user id and user passwords otherwise required for log in at that internet terminal, and establishing the user session independent of such otherwise normal log in procedure; and as part of the user session, locating at the server computer system to which the unique id information from the input smart card was transmitted, the account information for the uniquely identified user, and thereafter responding to subsequent service requests from that internet terminal in a manner determined by an environment associated with the user account.

23. The method of claim 22, wherein the environment associated with the user account includes a set of favorite web sites, and the step of responding to subsequent service requests from the internet terminal in a manner determined by an environment associated with the user account further includes the steps of:

the internet terminal making a request for favorite web sites; and responsive to the request, the server transmitting a set of favorite web sites associated with the user account.

24. The method of claim 22, wherein the environment associated with the user account includes a set of electronic mail addresses.

25. The method of claim 24, the method further including the steps of:

the internet terminal making a request to compose an electronic mail message; and responsive to the request, the server transmitting information including the set of electronic mail addresses.

26. The method of claim 22, wherein the predefined environment associated with the authorized user includes an electronic mail identifier by which electronic mail can be received from the Internet.

27. The method of claim 26, wherein the predefined environment associated with the authorized user includes a set of electronic mail messages addressed to the electronic mail identifier.

* * * * *

UNITED STATES PATENT AND TRADEMARK OFFICE
CERTIFICATE OF CORRECTION

PATENT NO. : 5,983,273
DATED : November 9, 1999
INVENTOR(S) : Christopher M. White, John Matheny, Patrick Bonnaure, Stephen G. Perlman, It is certified that error appears in the above-identified patent and that said Letters Patent is hereby corrected as shown below:

Col. 3, ln. 9: after "Inc. of" change "Palo Alto," to --Mountain View,--

Col. 8, ln. 53: before "Log-in" change "Smartcard" to --SmartCard--

Col. 8, ln. 62: after "particular" and before "WebTV" delete [the]

Col. 10, ln. 52: after "server" change "S" to --5--

Col. 11, ln. 49: after "of" and before "electronic" insert --retrieving the list of--

Col. 12, ln. 36: after "well" and before "user" insert --as--

Col. 12, ln. 40: after "plurality" and before "smart" insert --of--

Col. 13, ln. 29: before "client" change "or" to --of--

Col. 13, ln. 43: after "well" and before "user" insert --as--

Col. 13, ln. 47: after "plurality" and before "smart" insert --of--

Signed and Sealed this

Second Day of January, 2001

Attest:

Q. TODD DICKINSON

*Attesting Officer*    *Commissioner of Patents and Trademarks*